(No Model.)

W. H. KYNETT & C. W. VAN DUSEN.
BED PAN.

No. 454,826. Patented June 23, 1891.

WITNESSES

INVENTORS
W. H. Kynett
C. W. Van Dusen.
BY
E. W. Anderson
ATTORNEY.

UNITED STATES PATENT OFFICE.

WILLIAM H. KYNETT AND CURTIS W. VAN DUSEN, OF BATTLE CREEK, MICHIGAN; SAID VAN DUSEN ASSIGNOR TO SAID KYNETT.

BED-PAN.

SPECIFICATION forming part of Letters Patent No. 454,826, dated June 23, 1891.

Application filed February 6, 1891. Serial No. 380,437. (No model.)

*To all whom it may concern:*

Be it known that we, WILLIAM H. KYNETT and CURTIS W. VAN DUSEN, citizens of the United States, and residents of Battle Creek, in the county of Calhoun and State of Michigan, have invented certain new and useful Improvements in Bed-Pans; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
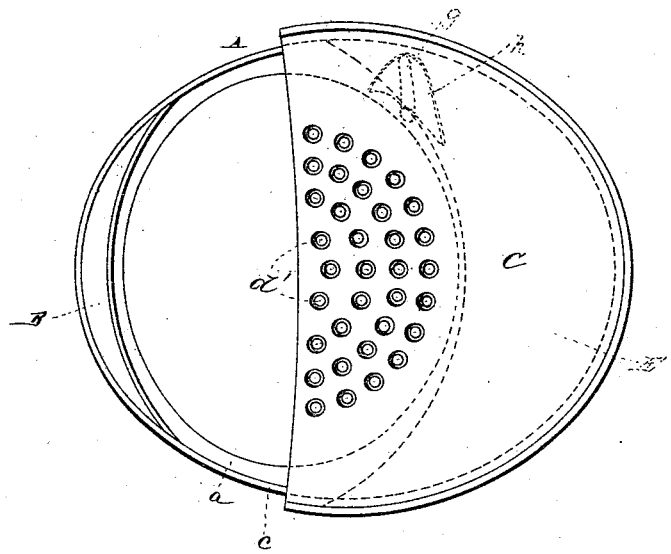
Figure 2:
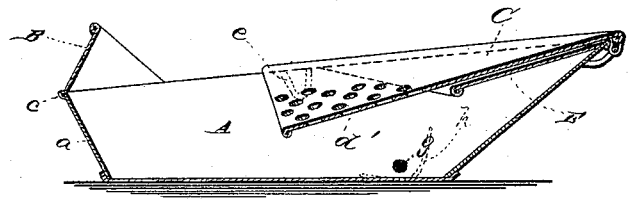
Figure 3:
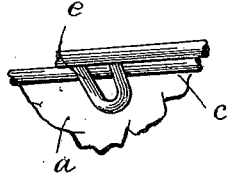

Figure 1 of the drawings is a top plan view, and Fig. 2 is a vertical longitudinal section. Fig. 3 is a detail view of one of the fastening devices for the cover.

The invention relates to improvements in bed-pans; and it consists in the novel construction and combination of parts, as hereinafter set forth.

In the accompanying drawings, the letter A refers to the body of the pan, its bottom being in the form of an ellipse having its transverse axis running from side to side and having the flaring side walls $a$, the greatest depth and flare being at the rear of the pan. The side wall is flared in such a manner as to terminate at its upper edge in an ellipse of greater diameter than the bottom and projected rearwardly beyond the bottom. The upper edge of the side wall is provided with a rim or flange $c$. The transverse axis of the elliptic top runs in a direction perpendicular to that of the bottom or from front to back.

B represents a crescent-shaped shield or guard which is secured to the upper front edge of the pan and extending upwardly and inwardly, thus preventing any splashing of the contents of the pan while being used. To the upper rear edge of the pan is hinged, pivoted, or otherwise loosely secured, the hip-rest or cover C, which is of approximately semicircular form, and when down covers somewhat more than half the surface of the pan. This cover when down projects a little beyond the side wall of the pan, and is locked thereto by means of the spring-lugs $e$ on the cover, which engage the rim or flange $c$, one on each side. This cover or hip-rest is of dished or concave form toward its central forward portion, where it is provided with a number of countersunk holes or perforations $d'$. This cover serves as a rest for the hips and lower portion of the body while the pan is in use, and the holes or perforations $d$ are for the purpose of permitting the escape therethrough into the pan of any fluid that may get on the cover and prevent its running back under the patient or soiling the bed-linen. The cover being hinged or otherwise loosely secured greatly facilitates the emptying, cleaning, and drying of the pan. The holes $d$ in the cover are preferably struck or cut from the top, so that their marginal edges are slightly depressed below the level of the surface.

E is a crescent-shaped guard or shield which is secured to the top edge of the back portion of the side wall of the pan beneath the cover or hip-rest, said guard or shield extending inwardly and slightly downward to a point preferably about beneath the backward or uppermost of the countersunk-holes $d'$. This shield or guard serves to prevent the contents of the pan from spilling when it is tipped backwardly when in use.

$g$ is a discharge, located preferably in the bottom edge of the pan and provided with the guard $h$, as shown.

The elliptic form of the bottom of the pan from side to side greatly facilitates the tipping of the pan backwardly when in use, and thus rendering it more comfortable to the patient, while the elliptic shape of the top from front to back affords greater convenience and space.

Having described the invention, what we claim as new, and desire to secure by Letters Patent, is—

1. The bed-pan having the guard or shield at the front and the rear top portions, and the semicircular hinged cover serving as a hip-rest and provided with the holes or perforations, substantially as described.

2. The bed-pan having its top and bottom each in the form of an ellipse, the transverse axes of which are perpendicular to each other, said pan also having a hinged or adjustable cover adapted to serve as a hip-rest and provided with holes or perforations, substantially as described.

3. The bed-pan having the flaring sides terminating at the top and bottom in an ellipse, the transverse axes of which are perpendicular to each other, in combination with the front and back shield-pieces and the hinged or pivoted cover having the perforations, substantially as described.

4. The bed-pan having the shields or guards, as described, and the hinged cover adapted to serve as a hip-rest, said cover having the countersunk perforations and the lugs or ears adapted to engage the rim or bead of the side wall for locking the said cover in position, substantially as described.

In testimony whereof we affix our signatures in presence of two witnesses.

WM. H. KYNETT.
CURTIS W. VAN DUSEN.

Witnesses:
MARTIN METCALF,
WILL A. CROSBY.